United States Patent

Yazawa

[11] Patent Number: 6,027,259
[45] Date of Patent: Feb. 22, 2000

[54] MOUNTING STRUCTURE FOR A PRESSURE PLATE IN A CAMERA

[75] Inventor: Kazuki Yazawa, Tokyo, Japan

[73] Assignee: Asahi Kogaku Kogyo Kabushiki Kaisha, Tokyo, Japan

[21] Appl. No.: 09/161,955

[22] Filed: Sep. 29, 1998

[30] Foreign Application Priority Data

Oct. 2, 1997 [JP] Japan ................................. 9-286131

[51] Int. Cl.$^7$ .................................................. G03B 17/00
[52] U.S. Cl. .......................................................... 396/442
[58] Field of Search ................................... 396/440, 535, 396/536, 442

[56] References Cited

U.S. PATENT DOCUMENTS 5,257,054  10/1993  Kameyama ............................ 396/442
5,907,732   5/1999  Ohmori ................................. 396/442

FOREIGN PATENT DOCUMENTS 2-36827   3/1990  Japan .
8-194256  7/1996  Japan .

*Primary Examiner*—Howard B. Blankenship
*Attorney, Agent, or Firm*—Greenblum & Bernstein, P.L.C.

[57] ABSTRACT

A mounting structure for a pressure plate in a camera 10. The camera 10 has i) a camera body with a back door 14 provided at the back of the camera body and ii) a pressure plate 18 disposed in the camera body. The mounting structure is designed for mounting the pressure plate 18 to the back door 14. The mounting structure comprises a leaf-spring member 20 disposed between the back door 14 and the pressure plate 18 for urging the pressure plate 18 in the forward direction of the camera 10. The three parts, i.e., the back door 14, the pressure plate 18 and the leaf-spring member 20, have various engaging portions provided on them, through which any two of the three parts are engageable with each other. The engagement between the back door 14 and the pressure plate 18, the engagement between the back door 14 and the leaf-spring member 20 and the engagement between the pressure plate 18 and the leaf-spring member 20 are maintained by means of the spring force provided by the leaf-spring member 20. The mounting structure uses only the three parts 14, 18 and 20. It uses no setscrew, no additional support member nor any other fixtures such as pins and clips, unlike any of prior art pressure plate mounting structures. The pressure plate mounting structure of the present invention can achieve considerable reduction in assembly costs of cameras.

9 Claims, 3 Drawing Sheets

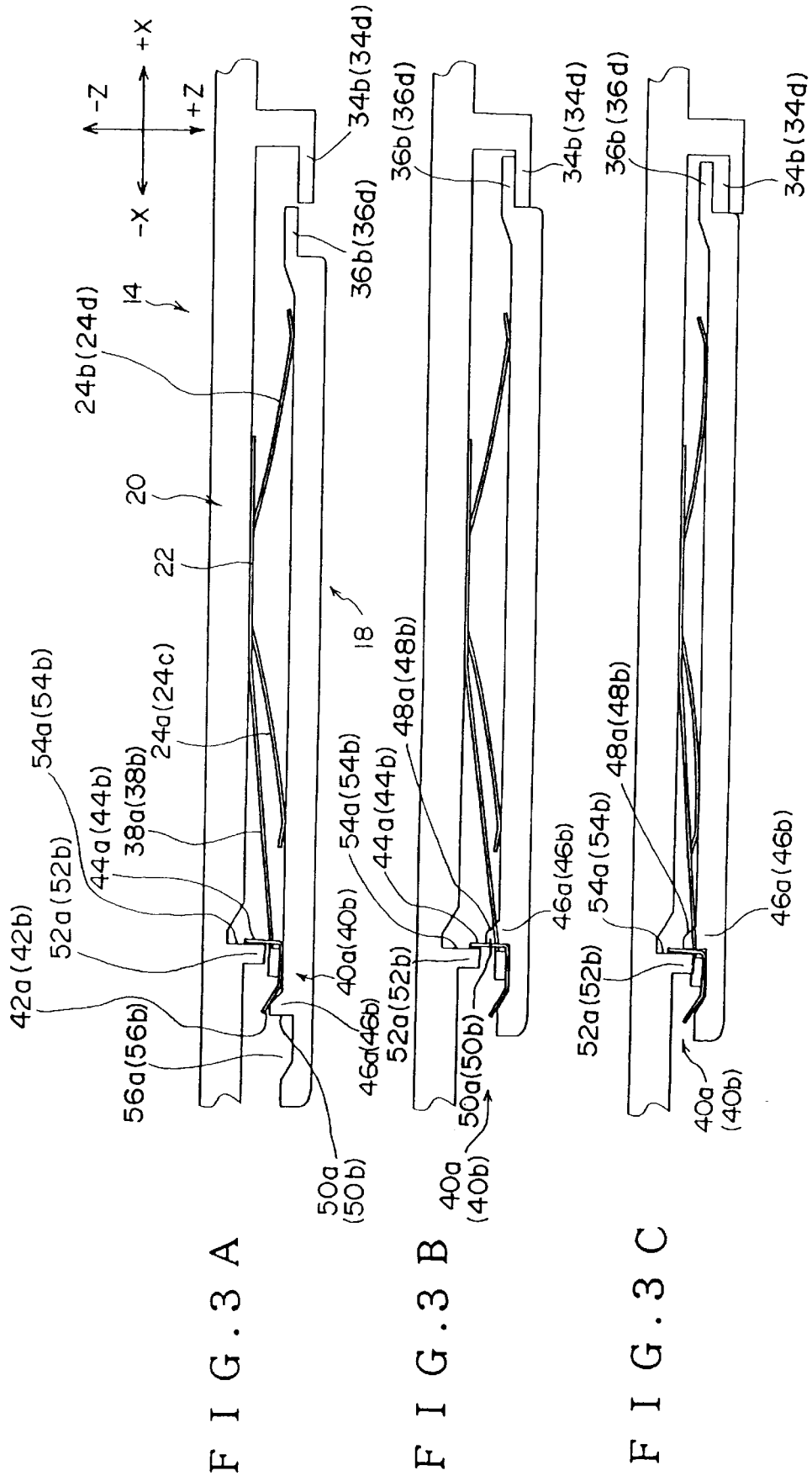

MOUNTING STRUCTURE FOR A PRESSURE PLATE IN A CAMERA

The present disclosure relates to subject matter contained in Japanese Patent Application No. Hei-9-286131 filed on Oct. 2, 1997, which is expressly incorporated herein by reference in its entirety.

BACKGROUND OF THE INVENTION

1. Field of the Invention

The present invention relates to a camera having a camera body with a back door provided at the back of the camera body and a pressure plate disposed in the camera body and, more particularly, to a pressure plate mounting structure for mounting such pressure plate to such back door.

2. Description of the Related Art

Most of 35 mm cameras using 35 mm film cassettes and many of roll-film cameras using, for example, 120 or 220 roll-films have a camera body with a back door provided at the back of the camera body for closing and opening a film cavity defined in the camera body. Such cameras also have a pressure plate disposed in the camera body for establishing required flatness of the portion of a filmstrip that is then located in the exposure area. Typically, the pressure plate is mounted to the inner side of the back door by means of one or more leaf springs, which serve to urge the pressure plate in the forward direction of the camera so as to press the front surface of the pressure plate against the back surface of the portion of the filmstrip in the exposure area.

There has been known a traditional mounting structure for mounting a pressure plate to a back door through one or more leaf springs, in which the leaf springs have one end secured to the back door by means of miniature setscrews and the other end to the pressure plate also by means of miniature setscrews. This mounting structure uses many miniature setscrews in total. It is difficult to automate such an assembly operation that requires miniature setscrews to be set and tightened, while a manual assembly operation handling miniature setscrews is time-consuming. This has been one of major difficulties in reducing assembly costs of cameras.

More recently, various pressure plate mounting structures have been developed in order to reduce required miniature setscrews used for mounting a pressure plate to a back door of a camera, including Japanese patent publication No. Hei-2-36827. This patent publication discloses a mounting structure for mounting a pressure plate to a back door of a camera, in which only one setscrew is used to secure a pressure plate support member onto the back door.

However, in any of prior art pressure plate mounting structures designed in an attempt to reduce setscrews required, the reduction of setscrews has been achieved only by using a certain additional support member and/or other fixtures such as pins and clips. The use of such additional parts has made it difficult to achieve the final purpose, i.e., reduction in assembly costs of cameras.

SUMMARY OF THE INVENTION

In view of the foregoing, it is an object of the present invention to provide a novel pressure plate mounting structure for mounting a pressure plate to a back door of a camera. The mounting structure may be designed to use only three parts, i.e., the back door, the pressure plate and a one-piece leaf-spring member. This means that the mounting structure uses no setscrew. Further, it uses neither additional support member nor any other fixtures such as pins and clips, which have been often used instead of setscrews in prior art pressure plate mounting structures. By virtue of this, the pressure plate mounting structure according to the present invention can contribute to quick assembly of cameras as well as can facilitate automated assembly operations of cameras, which in turn can lead to considerable reduction in assembly costs of cameras.

In accordance with one aspect of the present invention, there is provided a pressure plate mounting structure in a camera which has i) a camera body with a back door provided at the back of the camera body, ii) a camera lens with an optical axis defining Z-axis and iii) a pressure plate disposed in the camera body and extending parallel to XY-plane defined by X- and Y-axes orthogonal to Z-axis, wherein the pressure plate mounting structure is designed for mounting the pressure plate to the back door.

The pressure plate mounting structure comprises a leaf-spring member disposed between the back door and the pressure plate for urging the pressure plate in the forward direction of the camera along Z-axis, such that the leaf-spring member is urged against the back door by a reaction of an urging force of the leaf-spring member acting on the pressure plate.

The back door has a first engaging portion provided thereon and the leaf-spring member has a second engaging portion provided thereon for engagement with the first engaging portion, wherein the first and second engaging portions are arranged such that engagement between them i) substantially prevents displacement of the leaf-spring member in either direction along X-axis as well as in either direction along Y-axis relative to the back door and ii) substantially prevents rotation of the leaf-spring member in XY-plane relative to the back door.

The back door has a third engaging portion provided thereon and the pressure plate has a fourth engaging portion provided thereon for engagement with the third engaging portion, wherein the third and fourth engaging portions are arranged such that engagement between them i) defines a limit position to which displacement of the pressure plate in the forward direction of the camera along Z-axis relative to the back door is limited, ii) substantially prevents displacement of the pressure plate in either direction along Y-axis relative to the back door, iii) substantially prevents rotation of the pressure plate in XY-plane relative to the back door, and iv) substantially prevents displacement of the pressure plate in one direction along X-axis relative to the back door.

The leaf-spring member has a fifth engaging portion provided thereon and the pressure plate has a sixth engaging portion provided thereon for engagement with the fifth engaging portion, wherein the fifth and sixth engaging portions are arranged such that engagement between them substantially prevents displacement of the pressure plate in the other direction along X-axis relative to the back door.

The fifth engaging portion provided on the leaf-spring member and the sixth engaging portion provided on the pressure plate may be further arranged such that displacement of the pressure plate in said one direction along X-axis relative to the back door causes the fifth and sixth engaging portions to come into engagement with each other and thereafter displacement of the pressure plate in said other direction along X-axis relative to the back door is substantially prevented.

The leaf-spring member may be a one-piece member made of a thin plate of steel and may comprise i) a base portion adapted to be held against an inner surface of the back door, ii) a pressure plate urging arm extending from the base portion and having a tip end thereof adapted to urge the pressure plate and iii) a pressure plate engaging arm extending from the base portion and having a tip end thereof provided with the fifth engaging portion.

The fifth engaging portion provided on the leaf-spring member and the sixth engaging portion provided on the pressure plate each may comprise a slant surface slanting with respect to X-axis and an upright surface extending perpendicular to X-axis. Displacement of the pressure plate in said one direction along X-axis relative to the back door causes the slant surfaces of the fifth and sixth engaging portions to come into contact with each other, thereby deflecting the pressure plate engaging arm of the leaf-spring member, and then to pass by each other, thereby causing the fifth and sixth engaging portions to come into engagement with each other. Once the fifth and sixth engaging portions come into engagement with each other the upright surfaces of the fifth and sixth engaging portions are in abutment to each other so as to substantially prevent displacement of the pressure plate in said other direction along X-axis relative to the back door.

The back door may have a seventh engaging portion provided thereon, comprising an upright surface extending perpendicular to X-axis The upright surface of the seventh engaging portion provided on the back door backs up the upright surface of the fifth engaging portion provided on the leaf-spring member against a force acting on the upright surface of the fifth engaging portion.

The first engaging portion provided on the back door may comprise a pair of round protrusions raised from an inner surface of the back door and the second engaging portion provided on the leaf-spring member may comprise a combination of a round hole and an elongate hole both formed in the leaf-spring member for receiving the round protrusions, respectively.

The third engaging portion provided on the back door may comprise a plurality of engaging protrusions provided on an inner surface of the back door and the fourth engaging portion provided on the pressure plate may comprise a plurality of engaging protrusions provided along edges of the pressure plate.

In accordance with another aspect of the present invention, there is provided a pressure plate mounting structure in a camera which has i) a camera body with a back door provided at the back of the camera body and ii) a pressure plate disposed in the camera body, wherein the pressure plate mounting structure is designed for mounting the pressure plate to the back door. The pressure plate mounting structure comprises a leaf-spring member disposed between the back door and the pressure plate for urging the pressure plate in the forward direction of the camera. Three parts consisting of the back door, the pressure plate and the leaf-spring member have engaging portions provided thereon, through which any two of the three parts are engageable with each other. The engagement between the back door and the pressure plate, the engagement between the back door and the leaf-spring member and the engagement between the pressure plate and the leaf-spring member are maintained by means of the spring force provided by the leaf-spring member.

The leaf-spring member may be a one-piece member made of a thin plate of steel and may comprise i) a base portion adapted to be held against an inner surface of the back door, ii) a pressure plate urging arm extending from the base portion and having a tip end thereof adapted to urge the pressure plate and iii) a pressure plate engaging arm extending from the base portion and having a tip end thereof adapted to engage with the pressure plate.

BRIEF DESCRIPTION OF THE DRAWINGS

The above and other objects, features and advantages of the present invention will be apparent from the following detailed description of a preferred embodiment thereof, reference being made to the accompanying drawings, in which:

FIGS. 3A to 3C are cross-sectional views along line A—A of FIG. 2, showing the pressure plate mounting structure of FIG. 2 in different positions.

DETAILED DESCRIPTION OF A PREFERRED EMBODIMENT

Referring to the accompanying drawings, a preferred embodiment in accordance with the present invention will be described in detail.

Figure 1:
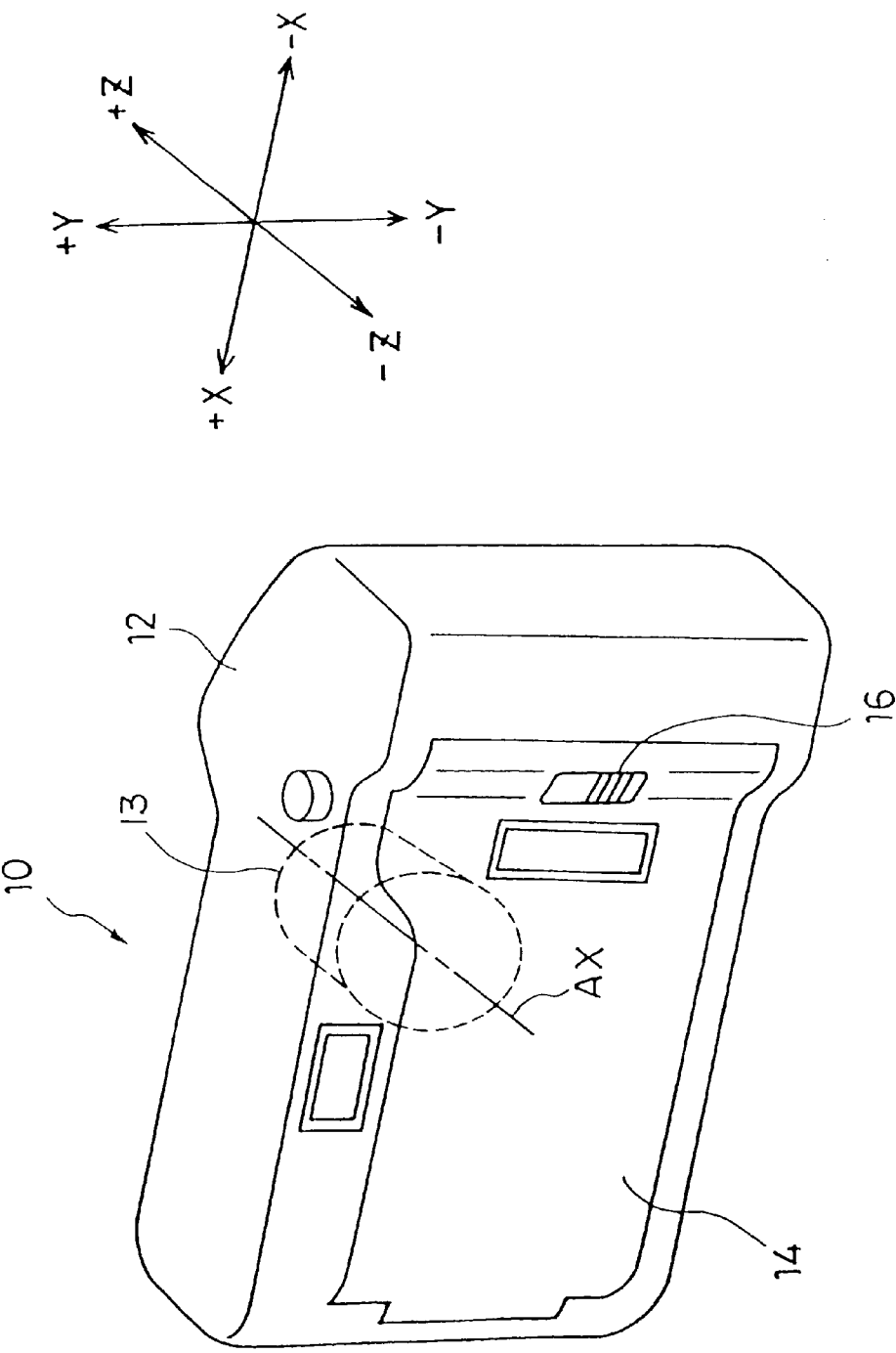
FIG. 1 is a perspective view of a 35 mm compact camera, which may adopt a pressure plate mounting structure in accordance with a preferred embodiment of the present invention.

FIG. 1 is a perspective view of a 35 mm compact camera 10, which may adopt a pressure plate mounting structure in accordance with a preferred embodiment of the present invention. As shown, the camera 10 has a camera body 12, a camera lens 13 provided at the front of the camera body 12 and a back door 14 provided at the back of the camera body 12. The back door 14 is hinged along its left-hand edge to the camera body 12 for opening and closing movement. The back door 14 has a latching knob 16 which is manipulated to lock the back door 14 closed and to unlock the back door 14 to open it when a 35 mm film cassette is inserted in or removed from a film chamber defined in the camera body 12.

In order to dearly indicate various directions referred to in the following description, a frame of reference is defined as follows. The camera lens 13 has an optical axis AX. The optical axis AX defines Z-axis, with the forward and rearward directions of the camera 10 being +Z- and −Z-directions, respectively. A vertical axis of the camera 10 as placed in its normal position such as shown in FIG. 1 defines Y-axis, with the upward and downward directions being +Y- and −Y-directions, respectively. A horizontal, transverse axis of the camera 10 as placed in its normal position defines X-axis, with the loft-hand and right-hand directions being +X- and −X-directions, respectively. The X-, Y- and Z-axes axes are orthogonal. All the directions mentioned above are indicated in FIG. 1.

Figure 2:
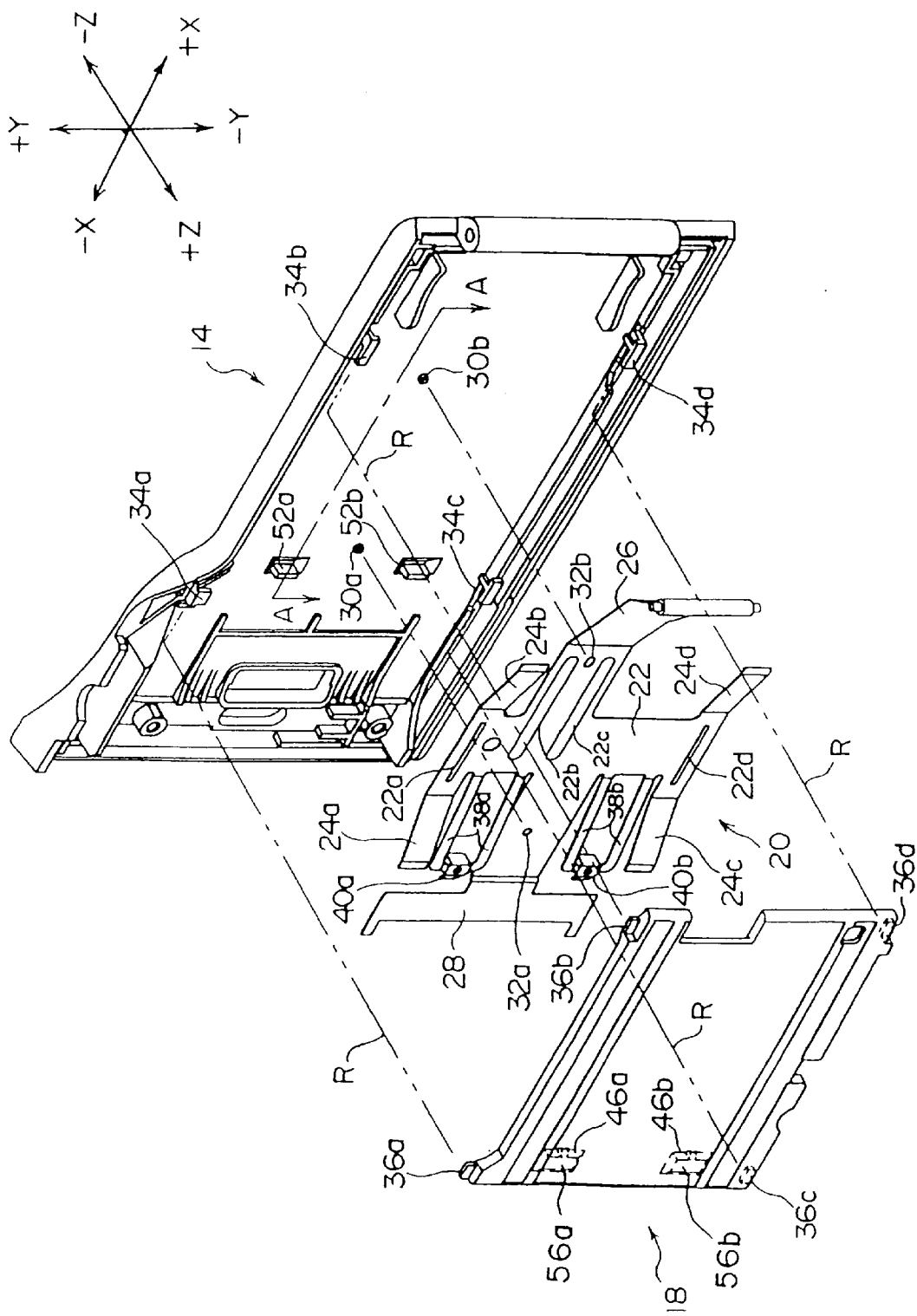
FIG. 2 is an exploded view of a pressure plate mounting structure in accordance with a preferred embodiment of the present invention.

FIG. 2 is an exploded view of the pressure plate mounting structure in accordance with a preferred embodiment of the present invention used in the camera 10 of FIG. 1, showing the back door 14, a pressure plate 18 and a leaf-spring member 20. The pressure plate 18 is disposed in the camera body and mounted to the back door 14. The pressure plate 18 extends parallel to XY-plane defined by X- and Y-axes. The pressure plate 18 has a front surface adapted for contact with and for urging against the back surface of the portion of a filmstrip that is then located in the exposure area, so as to establish required flatness of that portion of the filmstrip.

In accordance with one feature of the pressure plate mounting structure of the present invention, the leaf-spring member 20 is disposed between the back door 14 and the pressure plate 18. The leaf-spring member 20 serves to urge the pressure plate 18 in +Z-direction (i.e., in the forward direction of the camera 10 along Z-axis), such that the leaf-spring member 20 is urged against the inner surface of the back door 14 by a reaction of the urging force of the leaf-spring member 20 acting on the pressure plate 18.

The leaf-spring member 20 is a one-piece member made of a thin plate of steel, which has a sufficient resiliency to serve as a leaf spring. The leaf-spring member 20 comprises a base portion 22, which is nearly cross-shaped and adapted to be held against the inner surface of the back door 14. The base portion 22 has four horizontal reinforcement ribs 22a, 22b, 22c and 22d embossed by press working.

The leaf-spring member 20 further comprises a set of four spring arms 24a, 24b, 24c and 24d (referred to as the pressure plate urging arms hereinafter), which extend from the upper and lower ends of the base portion 22 in the directions substantially coincident with +X- and −X-directions but slightly deflected to +Z-direction. The spring arms 24a, 24b, 24c and 24d have their respective tip ends adapted to be in contact with the back surface of the pressure plate 18 and to urge the pressure plate 18 in +Z-direction.

The leaf-spring member 20 further comprises a fifth spring arm 26 for urging the leader portion of a filmstrip drawn from a film cassette onto the take-up spool during a film autoloading operation, which is performed just after the film cassette is inserted in the film chamber and the back door 14 is closed. The leaf-spring member 20 further comprises a sixth spring arm 28 for urging to secure the film cassette inserted in the film chamber. The spring arms 26 and 28 extend from the left-hand and right-hand ends of the base portion 22, respectively.

The back door 14 has a first engaging portion provided thereon and the leaf-spring member 20 has a second-engaging portion provided thereon for engagement with the first engaging portion. The first and second engaging portions are arranged such that the engagement between them i) substantially prevents displacement of the leaf-spring member 20 in either direction along X-axis as well as in either direction along Y-axis relative to the back door 14 and ii) substantially prevents rotation of the leaf-spring member 20 in XY-plane relative to the back door 14.

Specifically, the first engaging portion provided on the back door 14 comprises a pair of round protrusions 30a and 30b (referred to as the bosses hereinafter) raised from the inner surface of the back door 14. The second engaging portion provided on the leaf-spring member 20 comprises a combination of a round hole 32a and an elongate hole 32b both formed in the leaf-spring member 20 for receiving the bosses 30a and 30b, respectively. Fitting the bosses 30a and 30b into the holes 32a and 32b, respectively, will prevent the leaf-spring member 20 from displacing in either direction along X-axis as well as in either direction along Y-axis, as well as from rotating in XY-plane.

The back door 14 further has a third engaging portion provided thereon and the pressure plate 18 has a fourth engaging portion provided thereon for engagement with the third engaging portion. The third and fourth engaging portions are arranged such that the engagement between them i) defines a limit position to which displacement of the pressure plate 18 in +Z-direction (i.e., in the forward direction of the camera 10 along Z-axis) relative to the back door 14 is limited, ii) substantially prevents displacement of the pressure plate 18 in either direction along Y-axis relative to the back door 14, iii) substantially prevents rotation of the pressure plate 18 in XY-plane relative to the back door 14, and iv) substantially prevents displacement of the pressure plate 18 in +X-direction (i.e., in one direction along X-axis) relative to the back door 14.

Specifically, the third engaging portion provided on the back door 14 comprises a set of four engaging protrusions 34a, 34b, 34c and 34d, which are provided on the inner surface of the back door 14. The fourth engaging portion provided on the pressure plate 18 comprises a second set of four engaging protrusions 36a, 36b, 36c and 36d, which are provided along upper and lower horizontal edges of the pressure plate 18 at positions near the right and left ends of the edges.

The four engaging protrusions 34a–34d on the back door 14 each has a −Z-engaging surface facing toward −Z-direction, while the four engaging protrusions 36a–36d on the pressure plate 18 each has a +Z- engaging surface facing toward +Z-direction. The −Z-engaging surfaces of the former set of engaging protrusions 34a–34d are located aligned to and engageable with the respective +Z-engaging surfaces of the latter set of engaging protrusions 36a–36d, so that four protrusion pairs 34a/36a, 34b/36b, 34c/36c and 34d/36d are formed. By virtue of this arrangement, displacement of the pressure plate 18 in +Z-direction is limited to the point where +Z- and −Z-engaging surfaces of each protrusion pair come into contact with each other.

Further, each of the engaging protrusions 34a–34d on the back door 14 is located adjacent to and on the outside (with respect to the direction along Y-axis) of the associated one of the engaging protrusions 36a–36d on the pressure plate 18. This arrangement provides the engagement of the engaging protrusions 34a–34d with the engaging protrusions and 36a–36d in the direction along Y-axis, which substantially prevents the pressure plate 18 from displacing in either direction along Y-axis, as well as from rotating in XY-plane.

Moreover, two of the four engaging protrusions 34a–34d on the back door 14, 34b and 34d, each has a −X-engaging surface facing toward −X-direction, while the corresponding two of the four engaging protrusions 36a–36d on the pressure plate 18, 36b and 36d, each has a +X-engaging surface facing toward +X-direction. Each −X-engaging surface is engageable with the corresponding +X-engaging surface, and the engagement between them substantially prevents displacement of the pressure plate 18 in +X-direction relative to the back door 14.

The leaf-spring member 20 further has a fifth engaging portion provided thereon and the pressure plate 18 further has a sixth engaging portion provided thereon for engagement with the fifth engaging portion. The engagement between the fifth and sixth engaging portions substantially prevents relative displacement of the pressure plate in −X-direction (i.e., the other direction along the X-axis) with respect to the back door 14.

Specifically, the leaf-spring member 20 has further spring arms, i.e., a pair of pressure plate engaging arms 38a and 38b, extending from the base portion 22 in the direction substantially coincident with −X-direction but slightly deflected to +Z-direction. Each of the pressure plate engaging arms 38a and 38b comprises a pair of thin, parallel beams and an engaging tip 40a, 40b formed integral with and supported by the distal end of the beam pair. The fifth engaging portion provided on the leaf-spring member 20 comprises the engaging tips 40a and 40b of the pressure plate engaging arms 38a and 38b. As best seen in FIG. 3A, each of the engaging tips 40a and 40b has a slant surface 42a, 42b slanting with respect to X-axis and an upright surface 44a, 44b extending perpendicular to X-axis.

On the other hand, the pressure plate 18 has a pair of engaging protrusions 46a and 46b, which are raised from the back surface of the pressure plate 18 and located aligned to and engageable with the engaging tips 40a and 40b on the leaf-spring member 20, respectively. The sixth engaging portion provided on the pressure plate 18 comprises these engaging protrusions 46a and 46b. Each of the engaging protrusions 46a and 46b has a slant surface 48a, 48b (indicated in FIGS. 3B and 3C) slanting with respect to X-axis and an upright surface 50a, 50b (indicated in FIG. 3A) extending perpendicular to X-axis.

In assembly, the bosses 30a and 30b (or the first engaging portion) provided on the back door 14 are fitted in the round hole 32a and the elongate hole 32b (or, the second engaging portion) provided on the leaf-spring member 20, respectively, so as to cause the first and second engaging portions to come into engagement with each other. The leaf-spring member 20 is thereby substantially secured to the back door 14 against displacement in either of X- and Y-directions as well as against rotation in XY-plane.

Then, the pressure plate 18 is so aligned to the combination of the back door 14 and the leaf-spring member 20 thus assembled, as to establish their relative position that is shown in FIG. 2 and specifically indicated by four imaginary lines R in FIG. 2.

Then, the pressure plate 18 is depressed toward the back door 14 against the urging force of the leaf-spring member 20, resulting in the relative position of the three parts 14, 18 and 20 shown in FIG. 3A Then, the pressure plate 18 is displaced in +X-direction relative to the combination of the back door 14 and the leaf-spring member 20. This causes the engaging tips 40a and 40b (or the fifth engaging portion) provided on the leaf-spring member 20 to come into engagement with the engaging protrusions 46a and 46b (or the sixth engaging portion) provided on the pressure plate 18, as shown in FIG. 3B. Once the fifth and sixth engaging portions come into engagement with each other, displacement of the pressure plate 18 in the opposite, −X-direction relative to the back door 14 is substantially prevented by this engagement.

Specifically, displacement of the pressure plate 18 in +X-direction relative to the back door 14 causes the slant surfaces 42a and 42b of the engaging tips 40a and 40b (or the fifth engaging portion) provided on the leaf-spring member 20 and the slant surfaces 48a and 48b of the engaging protrusions 46a and 46b (or the sixth engaging portion) provided on the pressure plate 18 to come into contact with each other. The pressure plate engaging arms 38a and 38b of the leaf-spring member 20 are thereby deflected, so that the engaging tips 40a and 40b climb up with ease to the top of the engaging protrusions 46a and 46b, respectively.

Thereafter, continuing displacement of the pressure plate 18 causes the engaging tips 40a and 40b and the engaging protrusions 46a and 46b to pass by each other, so that the fifth and sixth engaging portions come into engagement with each other, as shown in FIG. 3B. Once this engagement is established, the upright surfaces 44a and 44b of the engaging tips 40a and 40b and the upright surfaces 50a and 50b of the engaging protrusions 46a and 46b are in abutment to each other so as to substantially prevent displacement of the pressure plate 18 in −X-direction relative to the back door 14.

The back door 14 further has a seventh engaging portion provided thereon. The seventh engaging portion comprises a pair of plate-shaped protrusions 52a and 52b extending upright on the inner surface of the back door 14 at the positions to be aligned to the corresponding engaging tips 40a and 40b of the leaf-spring member 20 when the leaf-spring member 20 is assembled to the back door 14.

Each of the plate-shaped protrusions 52a and 52b has an upright surface 54a, 54b (shown in FIGS. 3A–3C) extending perpendicular to X-axis and facing toward +X-direction. The upright surfaces 54a and 54b are located at the back of those portions of the engaging tips 40a and 40b of the leaf-spring member 20 which define the upright surfaces 44a and 44b, respectively. The upright surfaces 54a and 54b of the seventh engaging portion provided on the back door 14 serve to back up the upright surfaces 44a and 44b of the fifth engaging portion provided on the leaf-spring member 20 against forces acting on the upright surfaces 44a and 44b of the leaf-spring member 20 from the upright surfaces 50a and 50b of the engaging protrusions 46a and 46b, respectively, of the pressure plate 18.

Specifically, relatively strong forces may act on the upright surfaces 44a and 44b of the leaf-spring member 20 from the pressure plate 18 when, for example, a user of the camera 10 wipes out the front surface of the pressure plate 18 with a piece of cleaning cloth. In such a case, the pressure plate 18 is depressed down toward the back door 14 by means of the pressure applied from the piece of cleaning cloth used, so as to fall into the position shown in FIG. 3C. With the pressure plate 18 being in this position, any forces acting on the upright surfaces 44a and 44b of the leaf-spring member 20 in the normal direction are supported by the upright surfaces 54a and 54b of the protrusions 52a and 52b at the back of the upright surfaces 44a and 44b. Although the engaging tips 40a and 40b are portions of the leaf-spring member 20 made of a thin plate of steel so that they tend to deform with relatively small force applied thereto, the engaging tips 40a and 40b are effectively protected against such deformation by the protrusions 52a and 52b serving to back up them against the forces applied to them.

The pressure plate 18 further has a pair of recesses 56a and 56b formed in the back surface thereof at the positions adjacent to the engaging protrusions 46a and 46b and to −X-direction of the engaging protrusions 46a and 46b. When the fifth engaging portion (or the pair of engaging tips 40a and 40b) and the sixth engaging portion (or the pair of engaging protrusions 46a and 46b) are in engagement with each other, the engaging tips 40a and 40b of the leaf-spring member 20 are received in the recesses 56a and 56b, respectively.

As described above, each of the pressure plate engaging arms 38a and 38b comprises a pair of thin, parallel beams, so that the arms 38a and 38b may be readily twisted to produce torsional deformation thereof. This allows the engaging tips 40a and 40b supported at the distal ends of the arms 38a and 38b, respectively, to swing or rotate about respective longitudinal axes of the arms 38a and 38b, which axes are nearly coincident in direction with X-axis.

Accordingly, the engaging tips. 40a and 40b are i) supported for swinging movement about such axes and ii) received in the recesses 56a and 56b when the pressure plate mounting structure has been assembled. This arrangement is highly advantageous in that it effectively ensures the engagement between the fifth engaging portion on the leaf-spring member 20 and the sixth engaging portion on the pressure plate 18.

It is noted that the disclosed pressure plate mounting structure of the present invention uses only the three parts, i.e., the back door 14, the pressure plate 18 and the leaf-spring member 20. The three parts 14, 18 and 20 have various engaging portions provided on them, through which any two of the three parts 14, 18 and 20 are engageable with each other. Further, the engagement between the back door 14 and the pressure platen 18, the engagement between the back door 14 and the leaf-spring member 20 and the engagement between the pressure plate 18 and the leaf-spring member 20 are maintained by means of the spring force provided by the leaf-spring member 20.

In addition, according to the disclosed embodiment, the leaf-spring member 20 is completely hidden behind the pressure plate 18, so that any unintentional removal of the pressure plate 18 from the assembly may be effectively prevented, which could be otherwise caused when a user of the camera inadvertently touches the leaf-spring member 20 with his fingers.

Moreover, according to the disclosed embodiment, the required vertical dimension of the back door 14 may be reduced even to be the same as the pressure plate 18, which advantageously allows more compact designs of cameras.

As apparent from the above, according to the pressure plate mounting structure of the present invention, the back door, the pressure plate and the leaf-spring member have engaging portions provided thereon, the engagement among which determines the relative position of the three parts.

Thus, according to the present invention, a pressure plate can be mounted to a back door of a camera, using no setscrew. Further, it uses neither additional support member nor any other fixtures such as pins and clips, which have been often used instead of setscrews in prior art pressure plate mounting structures. By virtue of this, the pressure plate mounting structure according to the present invention can contribute to quick assembly of cameras as well as can facilitate automated assembly operations of cameras, which in turn can lead to considerable reduction in assembly costs of cameras.

Having described the present invention with reference to a preferred embodiment thereof, it is to be understood that the present invention is not limited to the disclosed embodiment, but may be embodied in various other forms without departing from the spirit and the scope of the present invention as defined by the appended claims.

What is claimed is:

1. In a camera having i) a camera body with a back door provided at the back of said camera body, ii) a camera lens with an optical axis defining Z-axis and iii) a pressure plate disposed in said camera body and extending parallel to XY-plane defined by X- and Y-axes orthogonal to Z-axis, a pressure plate mounting structure for mounting said pressure plate to said back door, comprising:

a leaf-spring member disposed between said back door and said pressure plate for urging said pressure plate in the forward direction of said camera along Z-axis, such that said leaf-spring member is urged against said back door by a reaction of an urging force of said leaf-spring member acting on said pressure plate;

said back door having a first engaging portion provided thereon and said leaf-spring member having a second engaging portion provided thereon for engagement with said first engaging portion, wherein said first and second engaging portions are arranged such that engagement between them i) substantially prevents displacement of said leaf-spring member in either direction along X-axis as well as in either direction along Y-axis relative to said back door and ii) substantially prevents rotation of said leaf-spring member in XY-plane relative to said back door;

said back door having a third engaging portion provided thereon and said pressure plate having a fourth engaging portion provided thereon for engagement with said third engaging portion, wherein said third and fourth engaging portions are arranged such that engagement between them i) defines a limit position to which displacement of said pressure plate in the forward direction of said camera along Z-axis relative to said back door is limited, ii) substantially prevents displacement of said pressure plate in either direction along Y-axis relative to said back door, iii) substantially prevents rotation of said pressure plate in XY-plane relative to said back door, and iv) substantially prevents displacement of said pressure plate in one direction along X-axis relative to said back door; and said leaf-spring member having a fifth engaging portion provided thereon and said pressure plate having a sixth engaging portion provided thereon for engagement with said fifth engaging portion, wherein said fifth and sixth engaging portions are arranged such that engagement between them substantially prevents displacement of said pressure plate in the other direction along X-axis relative to said back door.

2. A pressure plate mounting structure according to claim 1, wherein:

said fifth engaging portion provided on said leaf-spring member and said sixth engaging portion provided on said pressure plate are further arranged such that displacement of said pressure plate in said one direction along X-axis relative to said back door causes said fifth and sixth engaging portions to come into engagement with each other and thereafter displacement of said pressure plate in said other direction along X-axis relative to said back door is substantially prevented.

3. A pressure plate mounting structure according to claim 2, wherein:

said leaf-spring member is a one-piece member made of a thin plate of steel and comprises i) a base portion adapted to be held against an inner surface of said back door, ii) a pressure plate urging arm extending from said base portion and having a tip end thereof adapted to urge said pressure plate and iii) a pressure plate engaging arm extending from said base portion and having a tip end thereof provided with said fifth engaging portion.

4. A pressure plate mounting structure according to claim 3, wherein:

said fifth engaging portion provided on said leaf-spring member and said sixth engaging portion provided on said pressure plate each comprises a slant surface slanting with respect to X-axis and an upright surface extending perpendicular to X-axis, wherein displacement of said pressure plate in said one direction along X-axis relative to said back door causes said slant surfaces of said fifth and sixth engaging portions to come into contact with each other, thereby deflecting said pressure plate engaging arm of said leaf-spring member, and then to pass by each other, thereby causing said fifth and sixth engaging portions to come into engagement with each other; and wherein once said fifth and sixth engaging portions come into engagement with each other said upright surfaces of said fifth and sixth engaging portions are in abutment to each other so as to substantially prevent displacement of said pressure plate in said other direction along X-axis relative to said back door.

5. A pressure plate mounting structure according to claim 4, wherein:

said back door has a seventh engaging portion provided thereon, comprising an upright surface extending perpendicular to X-axis, and wherein said upright surface of said seventh engaging portion provided on said back door backs up said upright surface of said fifth engaging portion provided on said leaf-spring member against a force acting on said upright surface of said fifth engaging portion.

6. A pressure plate mounting structure according to claim 1, wherein:

said first engaging portion provided on said back door comprises a pair of round protrusions raised from an inner surface of said back door and said second engaging portion provided on said leaf-spring member comprises a combination of a round hole and an elongate hole both formed in said leaf-spring member for receiving said round protrusions, respectively.

7. A pressure plate mounting structure according to claim 1, wherein:

said third engaging portion provided on said back door comprises a plurality of engaging protrusions provided on an inner surface of said back door and said fourth engaging portion provided on said pressure plate comprises a plurality of engaging protrusions provided along edges of said pressure plate.

8. In a camera having i) a camera body with a back door provided at the back of said camera body and ii) a pressure plate disposed in said camera body, a pressure plate mounting structure for mounting said pressure plate to said back door, comprising:

a leaf-spring member disposed between said back door and said pressure plate for urging said pressure plate in the forward direction of said camera;

wherein three parts consisting of said back door, said pressure plate and said leaf-spring member have engaging portions provided thereon, through which any two of said three parts are engageable with each other; and wherein engagement between said back door and said pressure plate, engagement between said back door and said leaf-spring member and engagement between said pressure plate and said leaf-spring member are maintained by means of spring force provided by said leaf-spring member.

9. A pressure plate mounting structure according to claim 8, wherein:

said leaf-spring member is a one-piece member made of a thin plate of steel and comprises i) a base portion adapted to be held against an inner surface of said back door, ii) a pressure plate urging arm extending from said base portion and having a tip end thereof adapted to urge said pressure plate and iii) a pressure plate engaging arm extending from said base portion and having a tip end thereof adapted to engage with said pressure plate.

* * * * *